United States Patent
Kawata et al.

[19]

[11] Patent Number: 6,025,064
[45] Date of Patent: Feb. 15, 2000

[54] DECORATIVE ARTICLE AND PROCESS FOR PRODUCING THE SAME

[75] Inventors: Toshimichi Kawata, Ichinomiya; Ryoiti Takada, Hashima; Hideo Hirano, Chuo-ku; Hideo Ikai, Mobara, all of Japan

[73] Assignees: Toyoda Gosei Co., Ltd., Aichi; Kosuga & Co., Ltd., Tokyo, both of Japan

[21] Appl. No.: 09/096,612

[22] Filed: Jun. 12, 1998

[51] Int. Cl.⁷ ....................................................... B32B 3/26
[52] U.S. Cl. .................... 428/304.4; 428/308.4; 428/311.1; 428/310.5; 428/313.5; 264/48; 264/46.4; 264/45.5; 264/45.1; 264/500; 264/642
[58] Field of Search ............................. 428/73, 116, 280, 428/117, 308.4, 311.1, 310.5, 313.5; 52/612, 806; 264/48, 46.4, 45.5, 45.1, 500, 642

[56] References Cited

FOREIGN PATENT DOCUMENTS

| | | |
|---|---|---|
| 51-026203A | 4/1976 | Japan . |
| 3-26544 | 2/1991 | Japan . |
| 9226082A | 12/1995 | Japan . |
| 10-049332A | 2/1998 | Japan . |

*Primary Examiner*—Merrick Dixon
*Attorney, Agent, or Firm*—Pillsbury Madison & Sutro Intellectual Property Group

[57] ABSTRACT

A reinforcing plate is overlaid with a decoration sheet with a first adhesive layer interposed, and heated and pressed to form first laminate. A surface of the decoration sheet in the first laminate is coated with a clear second adhesive layer of a liquid polyurethane resin, a surface of which in turn is overlaid with a clear film and heated and pressed to prepare a second laminate. The second laminate is placed within a mold and a resin is insert molded on the reinforcing plate in the second laminate. A clear hard coating is preferably formed on a surface of the second laminate in order to provide higher abrasion resistance.

11 Claims, 7 Drawing Sheets

DECORATIVE ARTICLE AND PROCESS FOR PRODUCING THE SAME

BACKGROUND OF THE INVENTION

1. Field of the Invention

The present invention relates to a decorative article having resin combined integrally with a reverse surface of a decorative sheet (also referred to herein as the second laminate) by insertion molding. The invention also relates to a process for producing such a decorative article.

2. Description of the Related Art

A decorative article is currently used as an automotive inner trim and it is produced by in-mold shaping of a decorative sheet which uses a wood sheet as a decorative component.

Figure 10A:
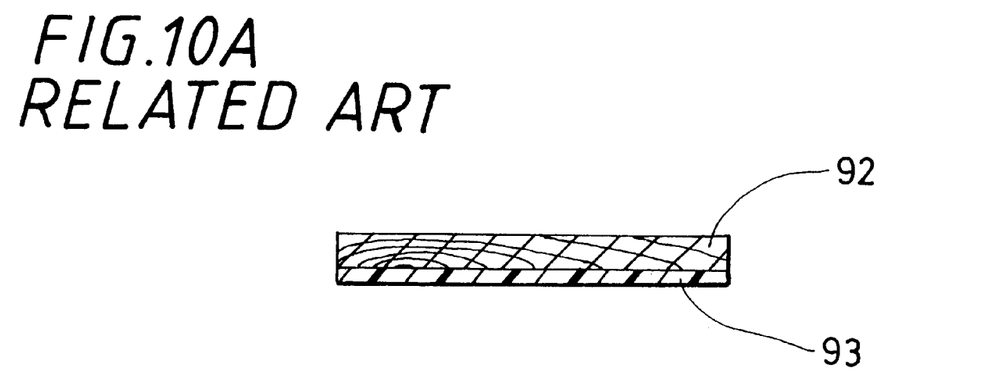
FIGS. 10A and 10B illustrate how a decorative article is manufactured in the conventional art.

The process of producing the conventional decorative article is shown schematically in FIGS. 10A to 11D. First, a wood sheet indicated by 92 in FIG. 10A is provided as a decorative sheet component in a thickness of about 200 to 500 μm. Then, a nonwoven fabric penetrated with a vinyl acetate-base adhesive 93 is heat-pressed to the wood sheet 92.

Figure 10B:
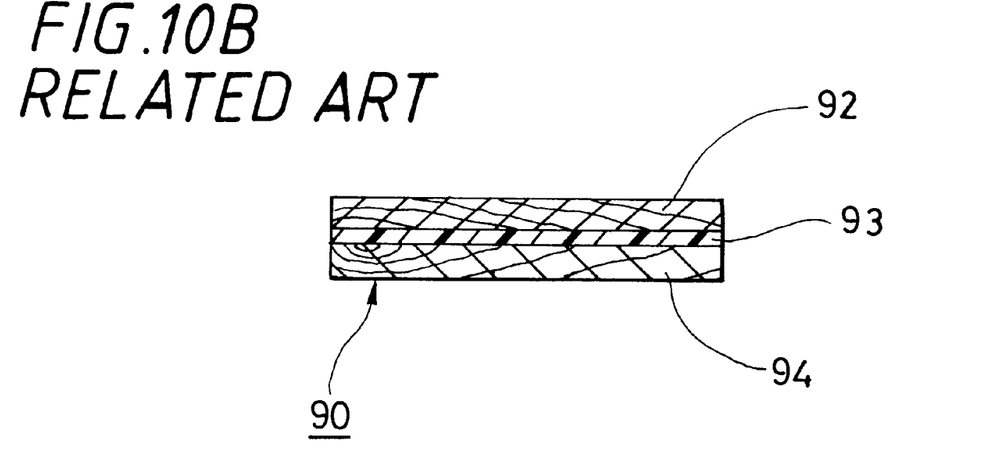
Figure 11A:
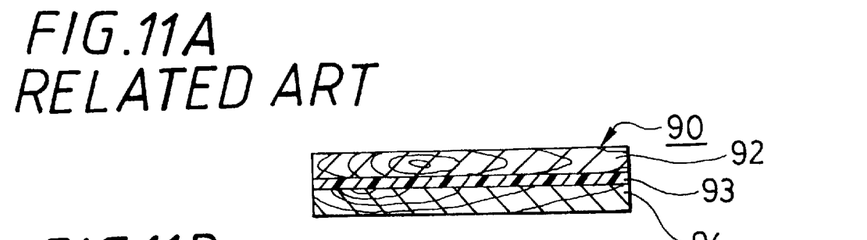
FIGS. 11A to 11D illustrate the steps which follow the steps shown in FIGS. 10A and 10B to manufacture the decorative article.
Figure 11B:
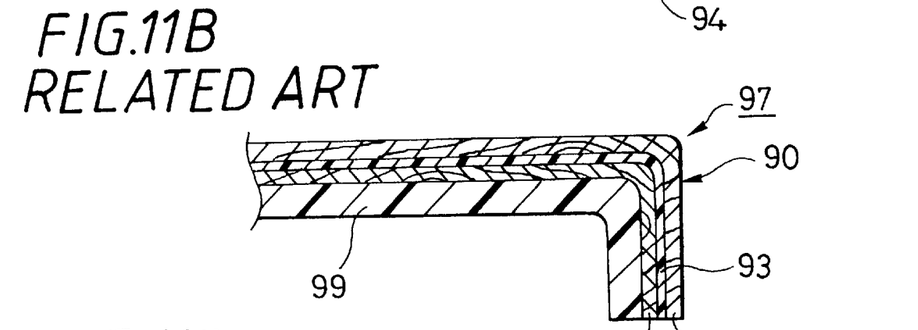

Then, a reinforcing plate indicated by 94 in FIG. 10B which is made of a polycarbonate resin or a veneer is adhered to the wood sheet 92 with the layer of adhesive 93 being interposed, thereby preparing a decorative sheet 90. Then, the decorative sheet 90 is inserted into a mold and a resin 99 is insert-molded on a back surface of the decorative sheet 90 to prepare an intermediate shape 97 which has the decorative sheet 90 combined integrally with a surface of the substrate of resin 99 as shown in FIG. 11B.

Figure 11C:
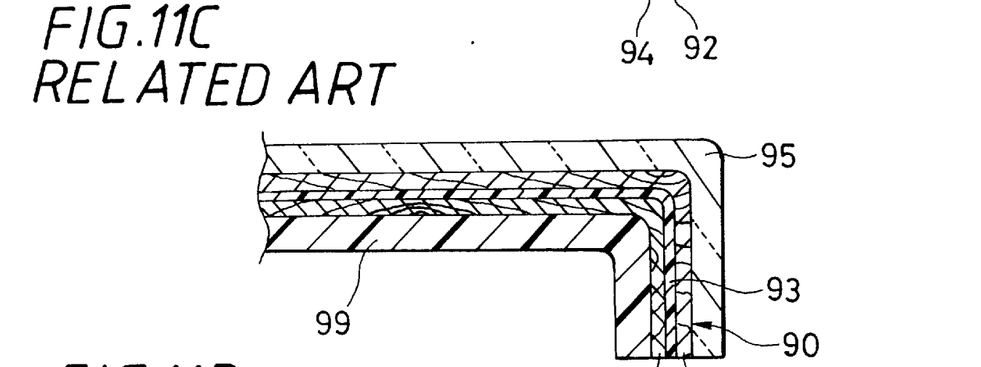
Figure 11D:
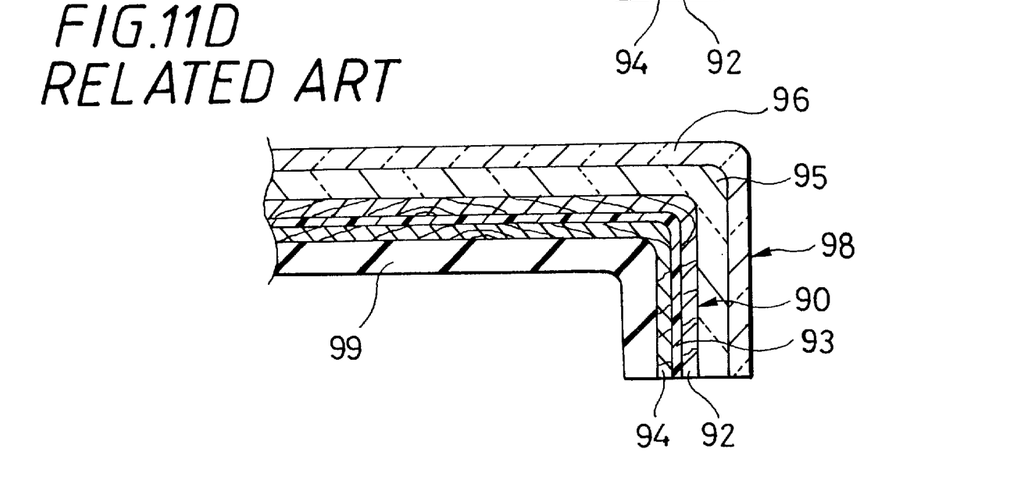

The subsequent steps are shown in FIGS. 11C and 11D. In order to provide the intermediate shape 97 with a smooth appearance that is also improved in such characteristics as transparency and depth, a first clear coat 95 made of a polyester is applied to a surface of the decorative sheet 90 and thereafter polished. The first clear coat 95 is overlaid with a second clear coat 96, which is subsequently polished to produce a decorative article 98.

The thus produced conventional decorative article 98 and the process for producing it have the following problems.

In order to have the desired characteristics in appearance such as smoothness, depth and mass, the conventional decorative articles require that surface polishing and coating operations be performed several times in the process of their production. As a result, the production efficiency is low and the intended cost reduction cannot be realized. On the other hand, if the surface polishing and coating operations are omitted, the characteristics in appearance such as smoothness and depth are compromised to degrade the value of the final product.

SUMMARY OF THE INVENTION

The present invention has been accomplished under these circumstances and has as an object providing a decorative article that can be easily produced without surface polishing and which yet has the desired characteristics in appearance such as smoothness and depth. Another object of the invention is to provide a process for producing the decorative article.

According to the present invention, there is provided process for producing a decorative article, comprising the steps of: placing a porous decoration sheet on a reinforcing plate with a first adhesive interposed pressing and heating the decoration sheet and the reinforcing plate so as to form an intermediate member (also referred to herein as the laminate); applying a clear second adhesive comprising polyurethane resin to a surface of the decoration sheet in the intermediate member; superposing a clear film on a surface of the second adhesive layer; and pressing and heating the intermediate member, the second adhesive layer and the film so as to produce a decorative sheet; placing the decorative sheet on a surface of a mold; and injecting resin on the reinforcing plate in the decorative sheet so as to produce the decorative article.

Two most salient aspects of the invention are as follows: i) by performing two cycles of each of the superposing and thermal pressing steps, a decorative sheet is formed from a laminate of the reinforcing plate, a decoration sheet and a clear film and subsequently resin is insert-molded (injected) on a reverse surface of the decorative sheet; ii) the decoration sheet and the overlying clear film are thermocompressed with a clear second adhesive comprising a polyurethane-base adhesive and being interposed between themselves.

The operating theory of the invention and the resulting advantages it achieves will now be described.

In the method of the invention, a decoration sheet is placed on a reinforcing plate with a first adhesive layer interposed and pressed and heated. As a result, the strength of the decoration sheet is improved to provide ease in handling.

Then, a clear film is placed on the decoration sheet with a clear second adhesive layer being interposed. The clear film has a smooth surface and thus contributes to provide a shaped decorative article the exterior appearance of which has the desired characteristics such as smoothness and depth.

As described above, the reinforcing plate, the decoration sheet and the clear film are placed one on another and pressed and heated using the first and second adhesives and, hence, there is no need to repeat the application and polishing of a clear coat as in the conventional art of producing a decorative article; instead, the desired article can be easily manufactured at a lower cost.

According to another feature of the invention, a clear second adhesive of a polyurethane resin is applied to a surface of the decoration sheet in the intermediate member which is made of the decoration sheet on the reinforcing plate. This contributes to provide an exterior appearance that has high clarity and sufficient depth to show the grain of wood.

The first adhesive is interposed between the decoration sheet and the reinforcing plate and the second adhesive is interposed between the decoration sheet and the clear film. The two adhesives provide sufficient adhering force to join the individual sheet members firmly and, in addition, the reinforcing plate provides adequate rigidity to secure an appropriate level of overall strength.

In the present invention, thermal pressing is performed twice, firstly after the first adhesive layer and the decoration sheet are superposed on the reinforcing plate and secondly after the second adhesive layer and the clear film are superposed on a surface of the decoration sheet. This makes it possible to perform thermal pressing under conditions that are optimal for the first and second adhesives, respectively, thereby providing strong adhering force.

The above-described process provides the following decorative article which has a decorative sheet combined integrally with a surface of a resin substrate, said decorative sheet comprising a reinforcing plate, a first adhesive layer, a decoration sheet, a clear second adhesive layer and a clear film that are placed one on another in the order written, and said second adhesive layer comprising a polyurethane-base adhesive.

Having the above-described laminated structure, the decorative article of the invention has superior characteristics in appearance and an appropriate level of strength. Stated more specifically, the clear film placed on a surface of the decoration sheet helps provide an exterior appearance having the desired characteristics such as smoothness and depth. In addition, the first and second adhesives provide sufficient adhering force to join the individual sheet members firmly and, what is more, the reinforcing plate provides adequate rigidity to secure an appropriate level of overall strength.

Further, the decoration sheet has preferably a backing member adhered to a reverse surface of a wood sheet, said backing member being penetrated with an adhesive. In this preferred case, the wood sheet is effectively reinforced against cracking that may occur during insert-molding. The wood sheet may be a very thin slice or sliver of wood. The backing member may be a nonwoven fabric, paper or an aluminum foil. Examples of the adhesive to be penetrated in the backing member include, but are not limited to, vinyl acetate and aqueous vinyl polyurethane.

The decoration sheet has preferably a water content higher than 0% but not higher than 12%. If the porous decorative sheet contains more than 12% water, the final product may lose water or swell during use at an elevated temperature and undulations may potentially occur in the surface.

More preferably, the water content of the decoration sheet ranges from 2% to 8%. Below 2%, the porous decorative sheet may potentially become brittle. Beyond 8%, air bubbles may potentially form in the decoration sheet.

And the decoration sheet has preferably a clear hard coating formed on a surface thereof in order to provide higher abrasion resistance. With this arrangement, not only the aforementioned superior appearance characteristics but also improved abrasion resistance is imparted to the decorative article, thereby expanding the range of its applicability.

The clear hard coating may be formed of acrylic, silicone-base and other types of coating agents. More specifically, the hard coating may be formed of organopolysiloxane resin, ultraviolet curable acrylic coating agent, or the like.

Further, the reinforcing plate is preferably porous. The resin in the substrate gets into the pores in the porous reinforcing plate to provide an anchor effect which allows the decorative sheet to adhere firmly to the resin substrate. Thus, the decorative sheet can be adhered to the resin substrate without using an adhesive. The porous reinforcing plate may be formed of a veneer of birch, mahogany or the like.

The reinforcing plate is preferably a resin plate because it helps impart a flexing property to the decorative sheet so that it can be incorporated in a curved surface of the resin substrate. The resin plate may be formed of a polycarbonate resin, an acrylic resin, an ABS resin (acrylonitrile-butadiene-styrene copolymer), a high-impact polystyrene resin or the like.

If the resin plate is to be used as the reinforcing plate, a third adhesive layer is preferably provided on a surface of the plate because it improves the adhering force between the decorative sheet and the resin substrate. The third adhesive layer may be formed of a polyolefinic, polyamide, acrylic, polyester or urethan base adhesive.

The first adhesive layer may be formed of a vinyl acetate, polyester, polyurethane, polyamide or otherwise based adhesive. Examples of the first adhesive include, but are not limited to, a heat-hardening adhesive and a hot-melt adhesive. The first adhesive may be in any form such as sheeting, paste or liquid.

The second adhesive of a polyurethane resin is preferably such that it has not only superior adhering, flowing, heat-resisting and lightproofing properties but has sufficient elasticity to provide an adequate film thickness. Liquid-type adhesive is preferably used as the second adhesive.

The second adhesive of a polyurethane resin may be formed of an acrylic polyurethan, polyester polyurethan, alkyd polyurethan or otherwise based adhesive.

Specifically, the second adhesive is preferably of a two-component reactive type which comprises an active component and a hardening component. The second adhesive helps provide clarity and smoothness and impart sufficient depth to exhibit the grain of wood.

In order to ensure that the reinforcing plate will not see through the decoration sheet, the two members have preferably the same color shade.

The decoration sheet may be a porous sheet formed of decorated paper, cloth or carbon fiber or, alternatively, it may be a very thin slice or sliver of wood. The porosity of this decorative sheet provides an anchor effect that helps improve the strength of adhesion offered by the adhesive.

A coloring layer may be provided on a surface of the decoration sheet to impart various colors to the sheet. The coloring layer may be formed of various paints which include, but are not limited to, acrylic, acrylurethane and urethane base paints.

The clear film to be formed on the second adhesive layer of a polyurethane resin should have a smooth surface and it may be formed of PC (polycarbonate), PMMA (polymethyl methacrylate), PVDF (polyvinylidene fluoride)/PMMA, PET (polyethylene terephthalate) or the like.

The clear film is not necessarily completely transparent and colorless and it may be colored or semitransparent. This is also true with the clear second adhesive layer and an optionally provided hard coating. The clarity within the scope of this definition allows the porous decorative sheet to provide an adequate decorative effect.

DETAILED DESCRIPTION OF THE PREFERRED EMBODIMENTS

1st Embodiment

A decorative article according to a first embodiment of the invention will now be described with reference to FIGS. 1 to 7. The decorative article indicated by 1 in FIG. 1 is formed by insert-molding of resin and intended for use as an automotive interior panel.

Figure 2:
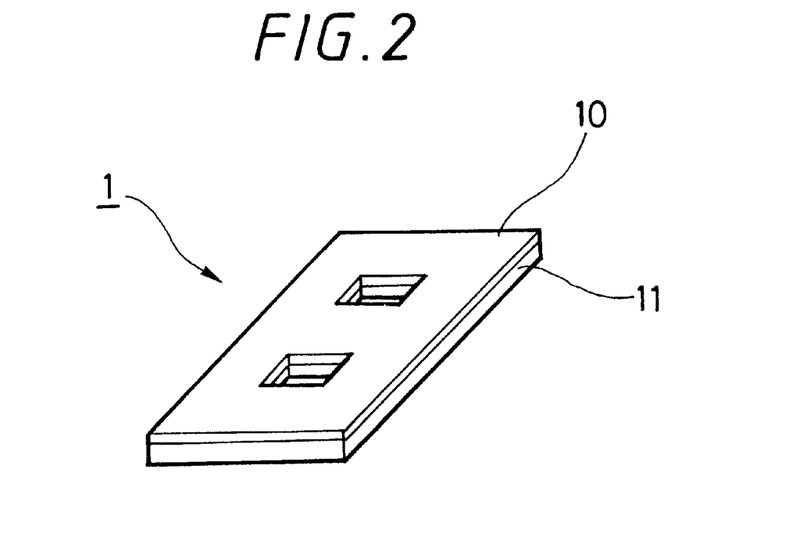
FIG. 2 is a perspective view of the decorative article according to the first embodiment.

As shown in FIG. 2, the decorative article 2 comprises a resin substrate 11 having a desired shape and a decorative sheet 10 which is combined integrally with a surface of the substrate 11.

Figure 1:
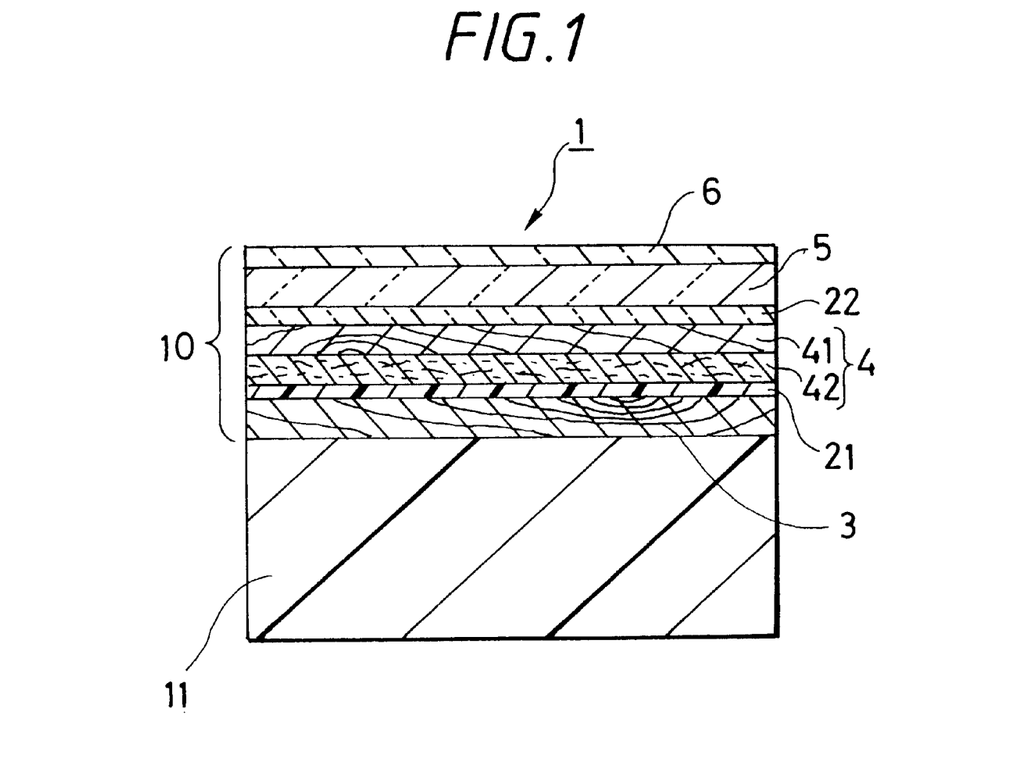
FIG. 1 is a partial enlarged cross section of a decorative article produced in a first embodiment of the invention.

As shown in FIG. 1, the decorative sheet 10 is a laminate of a reinforcing plate 3, a first adhesive layer 21, a decoration sheet 4, a clear second adhesive layer 22, a clear film 5 and a clear hard coating 6 which is provided to impart higher abrasion resistance. The decoration sheet 4 comprises a porous wood sheet 41 and a backing member 42 that is penetrated with an adhesive and compressed to a reverse surface of the patch 41.

The method of producing the decorative article 1 is now described with reference to FIGS. 3 to 7.

Figure 3:
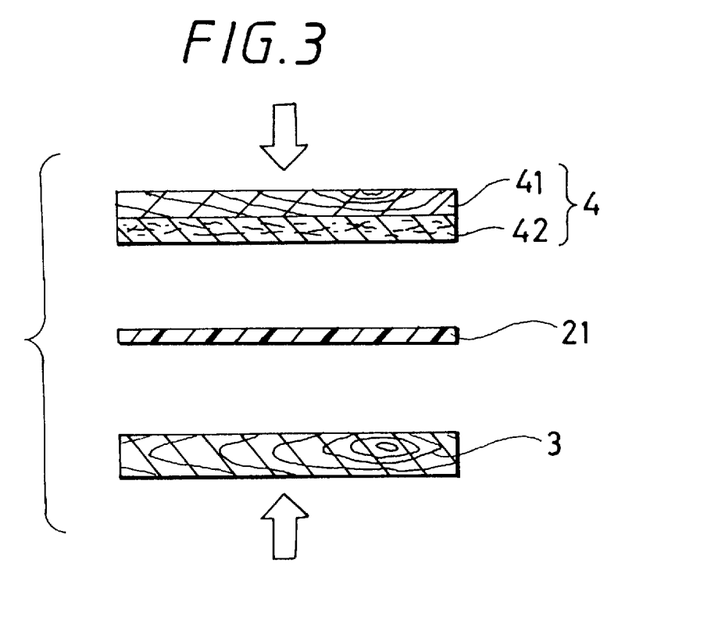
FIG. 3 illustrates how a reinforcing plate is superposed and thermally pressed onto a reverse surface of a decoration sheet in the first embodiment.

First, the wood sheet 41 having a wood grain pattern is provided as shown in FIG. 3. The wood shoot 41 is 200 to 250 $\mu$m thick and penetrated with water to less than 2%. The backing member 42 penetrated with a vinyl acetate base adhesive is compressed to a reverse surface of the wood sheet 41. The backing member 42 is a nonwoven fabric. The combination of the wood sheet 41 and the backing member 42 provides the decoration sheet 4.

Then, the first adhesive layer 21 and the decoration sheet 4 are superposed on the reinforcing plate 3 and pressed with heat to provide an intermediate member. The reinforcing plate 3 is a veneer 0.5 mm thick. The first adhesive layer 21 is a sheet of a hot-melt adhesive made from a rubber latex. The thermal pressing is performed at a temperature of 120 to 140° C. for a period of 5 minutes at a pressure of 10 to 30 kg/cm$^2$.

Figure 4:
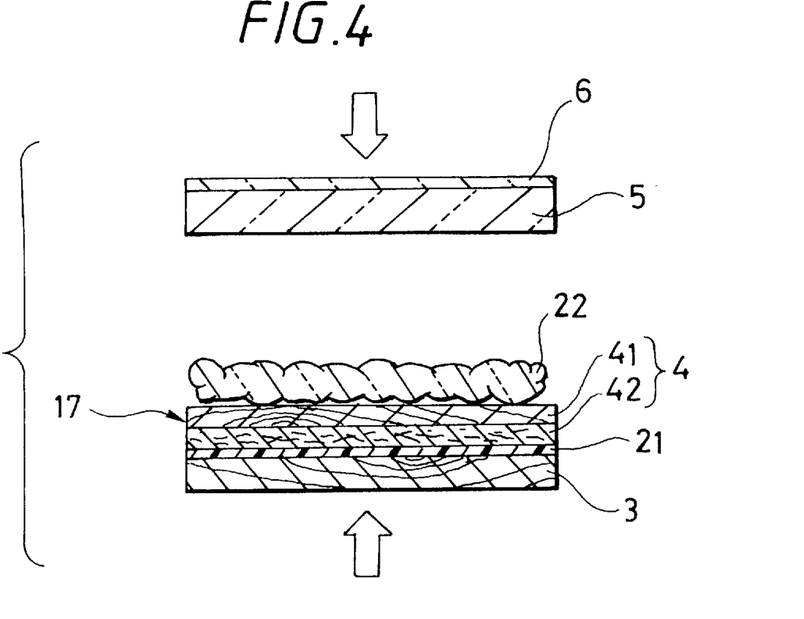
FIG. 4 illustrates how a clear film is superposed and thermally pressed onto a surface of the decoration sheet in the first embodiment.

Subsequently, as shown in FIG. 4, the second adhesive layer 22 is formed by applying a suitable second adhesive to the decoration sheet 4 in the intermediate member 17 and shaped over its entire surface. The second adhesive is a polyurethane resin, specifically, one of a two-component reactive type which comprises an active component and a hardening component.

Then, the surface of the intermediate member 17 on which the second adhesive layer 22 has been formed is covered with the clear film 5, which is subsequently pressed with heat. The clear film 5 is made of PC (polycarbonate) and preliminarily coated with the hard coating 6 made of an ultraviolet curable acrylic coating agent. The thermal pressing is performed at a temperature ranging from the ambient to 110° C. for a period of 5 minutes at a pressure of 3 to 30 kg/cm$^2$.

Figure 5:
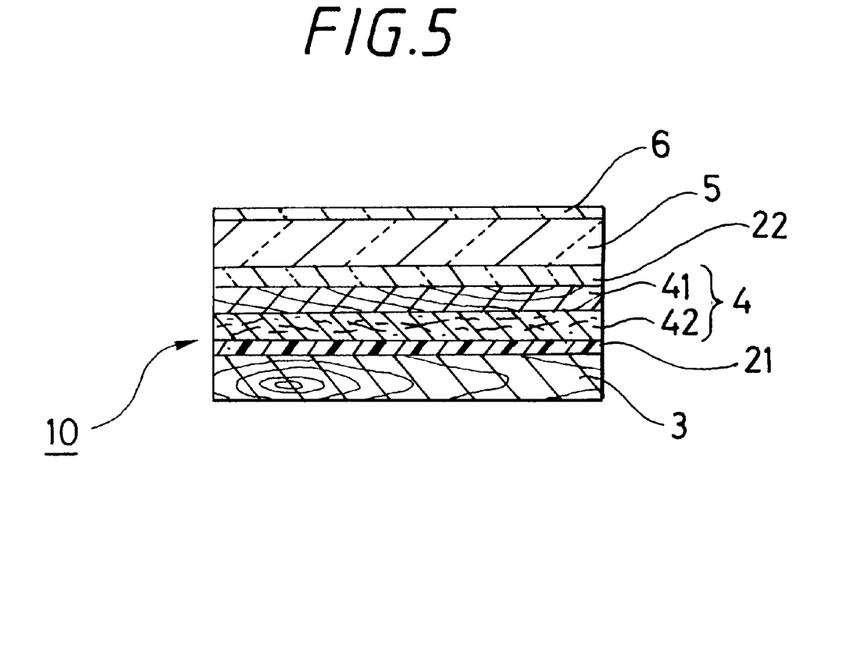
FIG. 5 is a cross section of a decorative sheet prepared in the first embodiment.

As a result, there is provided the decorative sheet 10 which, as shown in FIG. 5, comprises the reinforcing plate 3, the first adhesive layer 21, the decoration sheet 4, the second adhesive layer 22 and the clear film 5.

Figure 6:
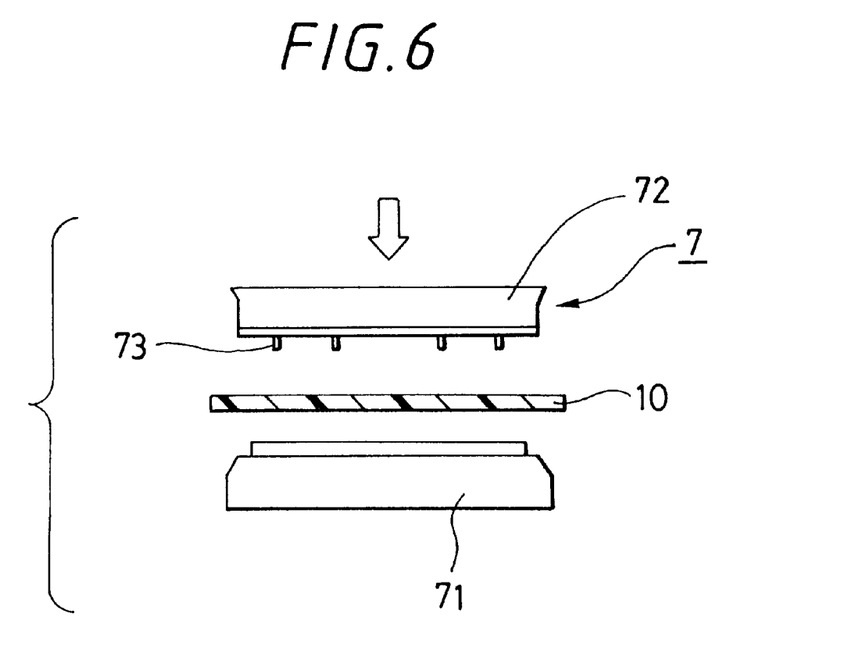
FIG. 6 illustrates how the decorative sheet is blanked in the first embodiment.

Subsequently, as shown in FIG. 6, the decorative sheet 10 is punched out in a desired shape using a punching tool 7 which has a stationary mold 71 and a moving mold 72, which has Thomson blades 73 provided in a desired pattern on the punching surface. The decorative sheet 10 is placed between the stationary mold 71 and the moving mold 72, which is then pressed against the stationary mold 71, whereupon a blank of the decorative sheet 10 is punched out in a desired shape.

Figure 7:
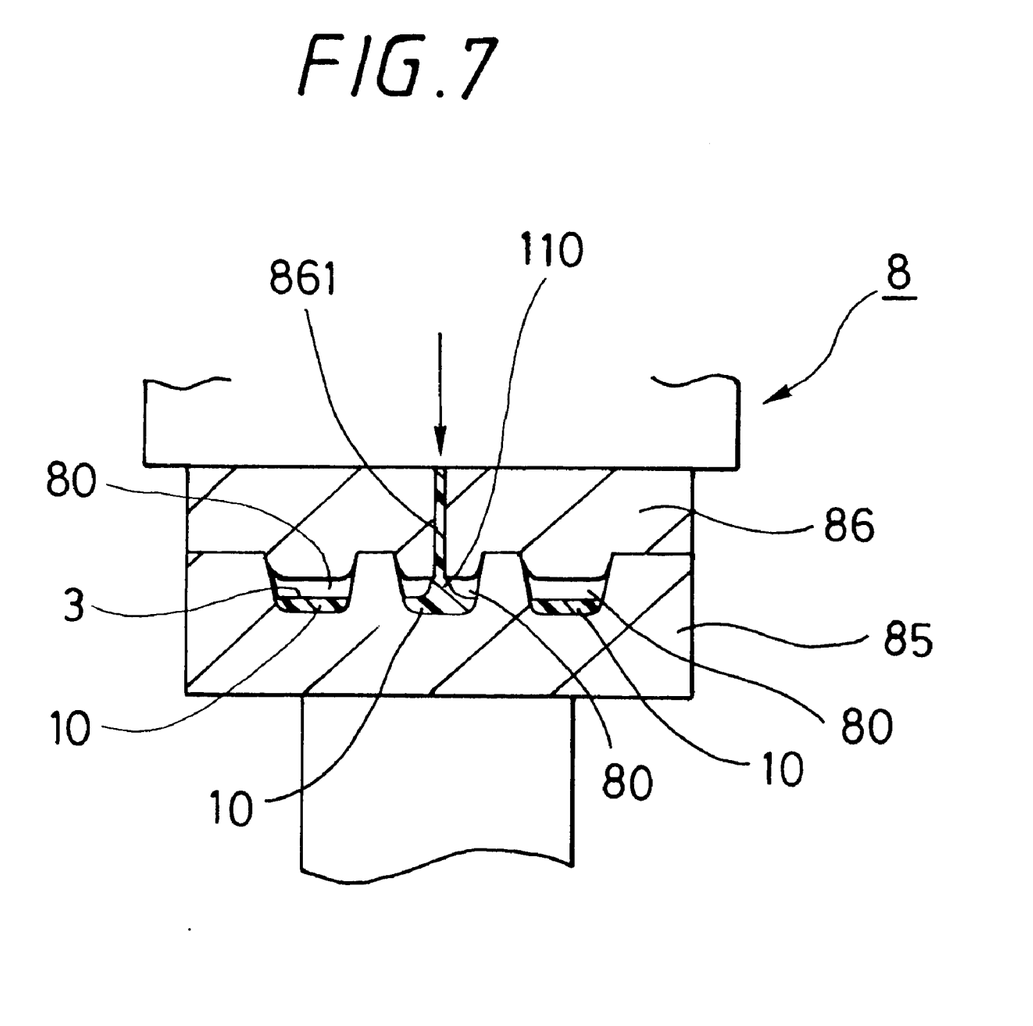
FIG. 7 illustrates how a decorative article is produced by insert-molding in the first embodiment.

Subsequently, as shown in FIG. 7, the blank of decorative sheet 10 having the desired shape is inserted into an injection molding machine 8 and resin is injection molded. To be more specific, the decorative sheet 10 is placed within a lower mold 85 of the molding machine 8. Then, a resin 110 is injected into a cavity between the lower mold 85 and an upper mold 86 through a nozzle 861 in the center of the upper mold 86 such that insortion molding of the resin is performed on the reinforcing plate 3 in the decorative sheet 10. As a result, the decorative article 1 (see FIGS. 1 and 2) is produced.

We then describe the operating theory of the first embodiment of the invention and the advantages it offers.

In the production process according to the first embodiment of the invention, the decoration sheet 4 using the wood sheet 41 is overlaid with the clear film 5 with the second adhesive layer 22 interposed as shown in FIG. 1. The clear film 5 has a smooth surface and provides the resulting shaped article 1 with an exterior appearance having the desired characteristics such as smoothness and depth. Hence, there is no need to repeat the application and polishing of a clear coat as in the conventional art of producing a decorative article, instead, the desired article can be easily manufactured at a lower cost.

In addition, having the above-described laminated structure, the decorative article 1 manufactured according to the first embodiment of the invention has superior characteristics in appearance and an appropriate level of strength. Stated more specifically, the clear film 5 placed on a surface of the decoration sheet 4 helps provide an exterior appearance having the desired characteristics such as smoothness and depth.

In addition, the clear second adhesive layer 22 made of a liquid polyurethane resin is applied to a surface of the decoration sheet 4. This helps the decorative article 1 exhibit the desired appearance characteristics such as smoothness and depth.

2nd Embodiment

Figure 8:
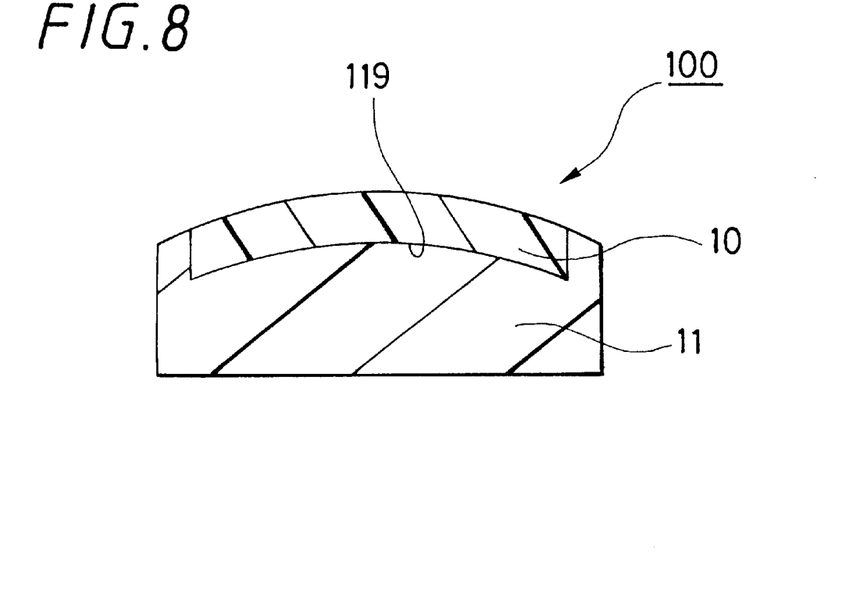
FIG. 8 is a cross section of a decorative article produced in a second embodiment of the invention.

A decorative article according to a second embodiment which is indicated by 100 in FIG. 8 comprises a decorative sheet 10 which is incorporated in a curved surface 119 of a resin substrate 11.

Figure 9:
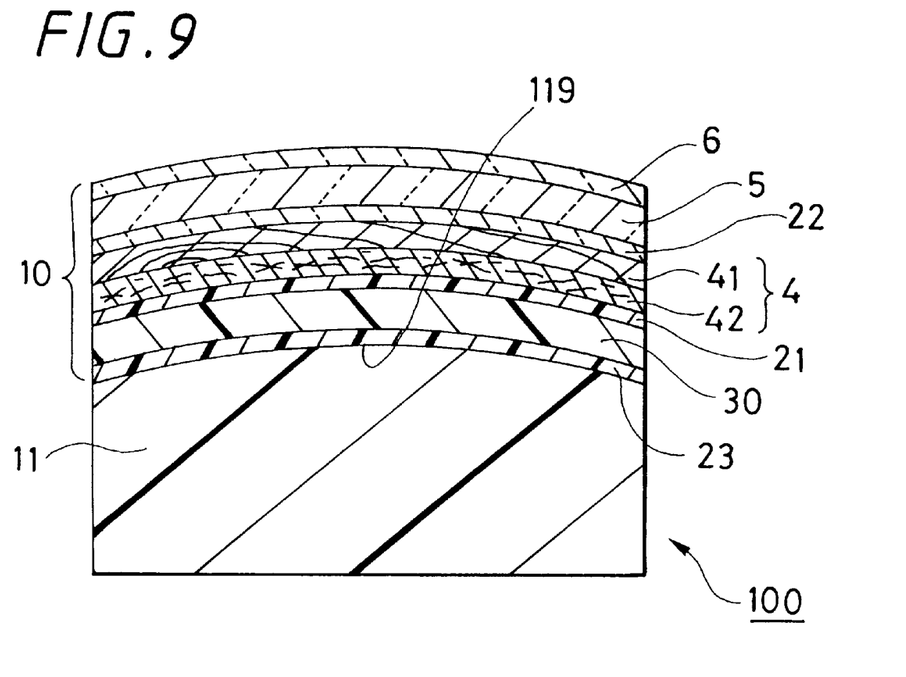
FIG. 9 is a partial enlarged cross section of the decorative article produced in the seond embodiment.

As shown in FIG. 9, the decorative sheet 10 comprises a third adhesive layer 23, a reinforcing plate 30, a first adhesive layer 21, a porous decorative sheet 4, a second adhesive layer 22, a clear film 5 and a hard coating 6.

The reinforcing plate 30 is made of a polycarbonate resin. The third adhesive layer 23 is made of a polyurethane, acrylic, vinyl acetate, polyamide, olefinic resin or the like.

The decoration sheet 4 comprises a wood sheet 41 and a backing member 42 which is compressed to a reverse surface of the patch 41. The backing member 42 is made of a nonwoven fabric which is internally penetrated with a vinyl acetate-base adhesive.

After all components are pressed and heated, the resulting decorative sheet 10 is curved in a desired shape using a thermal pressing machine. The curved decorative sheet 10 is inserted into an injection mold as in the first embodiment and integrally combined with a surface of a resin substrate 11 by insert-molding (see FIG. 7).

The other features of the second embodiment are the same as the already described first embodiment.

In the second embodiment, the reinforcing plate 30 is made of a polycarbonate resin and, hence, the decorative sheet 10 can be easily curved to be integrally combined with the curved surface 119 of the resin substrate. The other advantages of the second embodiment are the same as those attained by the first embodiment.

According to the present invention, there is provided a decorative article that can be easily produced without surface polishing and which yet has the desired characteristics in appearance such as smoothness and depth. Also provided is a process for producing the decorative article.

What is claimed is:

1. A process for producing a decorative article, comprising:

forming a first laminate comprising a porous decoration sheet adhered to a reinforcing plate by placing the porous decoration sheet on the reinforcing plate with a first adhesive interposed therebetween, and thermally pressing the porous decoration sheet and the reinforcing plate together;

applying a clear second adhesive comprising polyurethane resin to a surface of the porous decoration sheet of the first laminate;

applying a clear film on a surface of the second adhesive layer;

forming a second laminate by thermally pressing the first laminate, the second adhesive layer and the clear film, wherein the second laminate includes the reinforcing plate;

placing the second laminate on a surface of a mold; and injecting resin on the reinforcing plate of the second laminate so as to produce the decorative article.

2. The process according to claim 1, further comprising forming the decoration sheet by penetrating a backing member with an adhesive and adhering the backing member to a rear surface of a wood sheet.

3. The process according to claim 1, wherein the decoration sheet has a water content higher than 0% but not higher than 12%.

4. The process according to claim 1, wherein said clear second adhesive is liquid.

5. A decorative article comprising:

a resin substrate; and a laminate combined integrally with a surface of said resin substrate, said laminate comprising a reinforcing plate, a porous decoration sheet, a first adhesive layer interposed between the reinforcing plate and the porous decoration sheet, a clear film, and a clear second adhesive layer comprising a polyurethane-base adhesive interposed between the clear film and the porous decoration sheet.

6. The decorative article according to claim 5, wherein said decorative sheet comprises: a wood sheet; and a backing member adhered to a reverse surface of said wood sheet.

7. The decorative article according to claim 5, further comprising a clear hard coating formed on a surface thereof in order to provide higher abrasion resistance.

8. The decorative article according to claim 5, wherein said reinforcing plate comprises a porous plate.

9. The decorative article according to claim 8, wherein said porous plate comprises a veneer.

10. The decorative article according to claim 5, wherein said reinforcing plate comprises a resin plate.

11. The decorative article according to claim 10, further comprising a third adhesive layer provided on a surface of said resin plate.

\* \* \* \* \*